Aug. 4, 1925.
T. A. BOYD ET AL
1,548,440
POWER TRANSMISSION DEVICE
Filed May 12, 1924
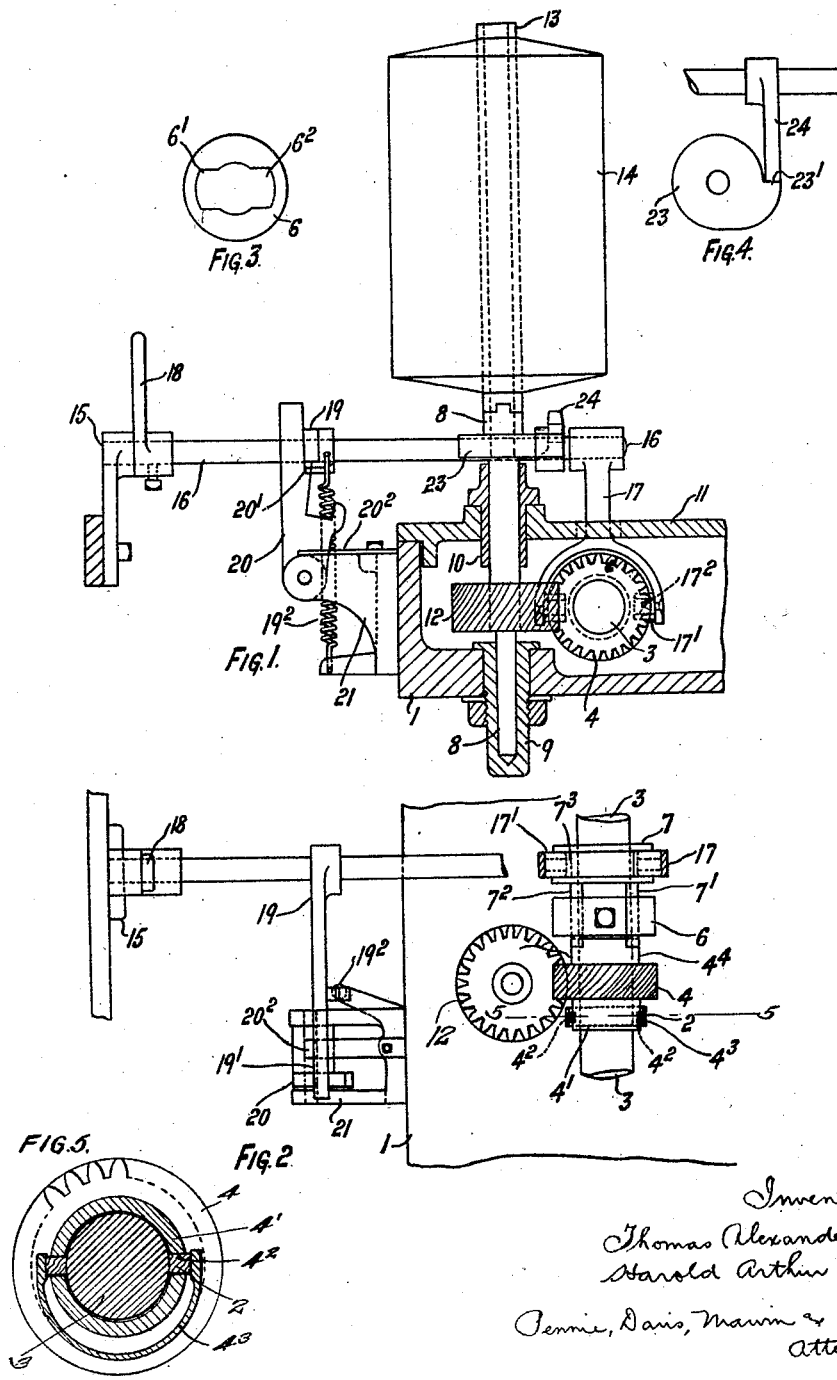

Patented Aug. 4, 1925.

1,548,440

UNITED STATES PATENT OFFICE.

THOMAS ALEX. BOYD AND HAROLD ARTHUR BOYD, OF SHETTLESTON, NEAR GLASGOW, SCOTLAND.

POWER-TRANSMISSION DEVICE.

Application filed May 12, 1924. Serial No. 712,594.

*To all whom it may concern:*

Be it known that we, THOMAS ALEXANDER BOYD and HAROLD ARTHUR BOYD, both subjects of the King of Great Britain and Northern Ireland, and residing at Shettleston, near Glasgow, Scotland, have invented a certain new and useful Improvement in Power-Transmission Devices, of which the following is a specification.

This invention relates to a power transmission device including a shaft or other rotor on which a wheel or other member (or members) is loosely mounted so that it can be stopped, which member, when working, is positively driven from said rotor, as by a clutch, and means for frictionally driving said member before it is positively driven so as to prevent damage to the clutch or other positive driver by its engagement with the said member.

There may also be incorporated in the said device means for stopping and starting rotation of an element driven by said wheel or member.

In the accompanying drawings Fig. 1 is a horizontal section, Fig. 2 a plan and Figs. 3 and 4 detail views of a device for driving and stopping the spindles of a cheese-winding machine for winding cotton yarn. Fig. 5 is a section (to enlarged scale) on the line 5—5 of Fig. 2.

In the drawings, 1 denotes a spindle rail of box-shape, disposed horizontally, and adapted to be carried on a suitable framing which in practice extends from end to end of the winding frame. Inside the spindle rail 1 we mount in bearings a horizontal driving shaft 3. On the driving shaft 3 we mount for each spindle to be driven a spiral driving gear 4. The gear 4 has on one side a boss $4'$ through which two holes $4^2$ are bored at right angles to its axis. We place in each of the holes $4^2$ a friction block 2 (preferably of hard wood) concaved cylindrically at its inner end to conform with the shaft 3. The friction blocks 2 are pressed against the shaft 3 by means of a semi-circular hoop spring $4^3$ supported on the outer ends of the friction blocks 2 and having projections to bear upon the friction blocks 2. By means of the friction blocks 2 the driving shaft 3 normally drives the spiral gear 4 frictionally. At the side of the spiral gear 4 opposite the boss $4'$ we form two prongs $4^4$ by which the said gear may be positively driven, as hereafter described. Fixed on the shaft 3, just clear of the prongs $4^4$, is a driving collar 6. Slots $6'$ and $6^2$ are formed through the collar 6 next to the shaft 3. At the side of the collar 6 remote from the spiral gear 4 we mount on the shaft 3 a sliding clutch member 7 having two prongs $7'$ and $7^2$ which pass through the slots $6'$ and $6^2$ of the collar 6. When the clutch member 7 is slid along the shaft 3 towards the spiral gear 4, the prongs $7'$ and $7^2$, which are driven by the driving collar 6, engage with the prongs $4^4$ on the spiral gear 4 and drive the latter positively. It will thus be understood that the spiral gear 4 is driven frictionally by means of the wood blocks 2 and positively when the prongs $7'$ and $7^2$ of the clutch member 7 are caused to engage with the prongs $4^4$ of the spiral gear 4. In the spindle rail 1 to the front side of the driving shaft 3 opposite the spiral driving gear 4 we mount a vertical spindle 8 supported in a footstep 9 mounted in the bottom of the spindle rail 1 and also in a neck 10 on a plate 11 mounted on the top of the spindle rail 1. Between the step 9 and the neck 10 we mount on the vertical spindle 8 a spiral pinion 12 which meshes with the spiral driving gear 4 on the driving shaft 3. On the vertical spindle 8, which extends upwards to a suitable height, we mount a wood tube 13 upon which we wind a cheese 14 of yarn, which yarn is traversed up and down by suitable mechanism. On the top plate 11 of the spindle rail 1 at a suitable distance above the same we mount in bearings a clutch spindle 16 extending inwards to the back of the spindle rail 1 and outwards to a position convenient for the worker. The clutch spindle 16 is disposed horizontally at right angles to the spindle 8 and with its axis above the centre of the groove $7^3$ in the clutch member 7 when the clutch member is at its mid-position on the driving shaft. Above the clutch member 7 we mount on the clutch spindle 16 a clutch fork 17 which embraces the clutch member 7 and has at either side of the clutch member 7 a stud $17^2$ and friction roller $17^1$ by means of which to operate the clutch member 7. At the outer end of the clutch spindle 16 we mount a starting lever 18 by which the clutch member 7 is moved into engagement with the driving wheel 4 on the driving shaft 3. On the clutch spindle 16 we mount a locking lever 19 the outer end 19' of which rests upon a chin 20' on a vertical catch lever 20 which we journal in a bracket 21 at a suitable distance below the said chin 20'. The pivot of the vertical catch lever 20 is horizontal and parallel with the spindle rail 1 so that the lever 20 is free to be pressed outwards to withdraw the chin 20' from under the locking lever 19. The catch lever 20 is kept in its vertical working position by means of a flat spring $20^2$. Fixed on the locking lever 19 is a helical spring $19^2$ adapted to pull the lever downwards when the chin support is withdrawn. By means of the starting lever 18 and the clutch spindle 16 the clutch member 7 may be moved along the driving shaft 3 to engage with the gear 4 which is thereby positively driven, the clutch member being held in working position by the locking lever 19. When the catch lever 20 is moved outwards, the locking lever 19 is drawn downwards and withdraws the clutch member 7 from its driving position, whereupon the positive driving of the gear 4 on the driving shaft ceases while it continues to be frictionally driven and to drive the vertical spindle 8. To bring the latter to a dead stop, we screw upon it a stopper plate 23, Figs. 1 and 4, with a projecting catch 23'. On the clutch spindle 16 we mount a spindle stopper lever 24 at an inclination to the lever 19, said stopper lever being so disposed as to come into the path of the stopper plate 23 and stop the vertical spindle 8 when the clutch spindle 16 is turned to withdraw the clutch member 7 from the driving gear 4. It will thus be understood that the vertical spindle is started frictionally when the clutch spindle is first turned. On further rotation of the clutch spindle the driving gear and the vertical spindle are positively driven and vice versa.

What we claim is:—

1. In a power transmission device, in combination, a continuously rotatable shaft, a gear element free on said shaft, means at one side of said gear element for coupling said gear element frictionally with said shaft, a driving collar fixed on said shaft at the opposite side of said gear element, a clutch member movable endwise of said shaft adapted to couple said gear element positively with said collar, a driven gear element operatively connected with said first mentioned gear element, means for arresting said driven gear element, and clutch actuating means operable to liberate said driven gear element and concomitantly therewith to initiate the frictional drive of said driven gear element and thereafter to effect the positive drive of said driven gear element.

2. In a power transmission device, in combination, a continuously rotatable shaft, a gear element free on said shaft, means at one side of said gear element for coupling said gear element frictionally with said shaft, a driving collar fixed on said shaft at the opposite side of said gear element, a clutch member movable endwise of said shaft to couple said gear element positively with said collar, a clutch fork to move said clutch member, a clutch spindle carrying said fork, a driven spindle actuated by said gear element, a stopping lever on said clutch spindle to arrest said driven spindle, and a starting lever on said clutch spindle movable to disable said stopping lever and permit said driven spindle to be driven first frictionally and then positively.

3. In a power transmission device, in combination, a continuously rotatable shaft, a gear element free on said shaft, means at one side of said gear element for coupling said gear element frictionally with said shaft, a driving collar fixed on said shaft, a clutch member movable endwise of said shaft adapted to couple said gear element positively with said collar, a clutch fork to move said clutch member, a clutch spindle carrying said fork, a driven gear element meshed by said first mentioned gear element, means on said spindle for arresting said driven gear element, a starting lever on said spindle operable to disengage said arresting means, to initiate the frictional drive of said driven gear element and thereafter bring about the positive drive of said driven gear element, a locking lever also on said spindle, and a catch lever engageable with said locking lever but disengageable therefrom when said clutch member is retracted from said first mentioned gear element.

In testimony whereof we have signed our names to this specification in the presence of two subscribing witnesses.

THOMAS ALEX. BOYD.
HAROLD ARTHUR BOYD.

Witnesses:
ISABEL ROLLO.
JEAN MCPHERSON.